(12) United States Patent
Bharti et al.

(10) Patent No.: US 11,416,953 B2
(45) Date of Patent: Aug. 16, 2022

(54) MONITORING UTILITY ASSETS USING CROWD-SOURCED DIGITAL IMAGE DATA

(71) Applicant: INTERNATIONAL BUSINESS MACHINES CORPORATION, Armonk, NY (US)

(72) Inventors: Harish Bharti, Dublin, OH (US); Pinaki Bhattacharya, Pune (IN); Hemant Khadke, Pimple Saudagar (IN); Dinesh Wadekar, Hadapsar (IN); Rajesh Kumar Saxena, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 16/439,219

(22) Filed: Jun. 12, 2019

(65) Prior Publication Data
US 2020/0394725 A1 Dec. 17, 2020

(51) Int. Cl.
*G06Q 10/06* (2012.01)
*G06Q 50/06* (2012.01)
*G06F 16/538* (2019.01)

(52) U.S. Cl.
CPC .......... *G06Q 50/06* (2013.01); *G06F 16/538* (2019.01); *G06Q 10/06316* (2013.01)

(58) Field of Classification Search
CPC . G06Q 50/06; G06Q 10/06316; G06F 16/538
See application file for complete search history.

(56) References Cited

U.S. PATENT DOCUMENTS

| 2007/0059986 | A1 | 3/2007 | Rockwell | |
| 2011/0295658 | A1* | 12/2011 | Bastos | G06Q 30/0207 |
| | | | | 705/14.1 |
| 2015/0227999 | A1* | 8/2015 | Maguire | G06Q 50/01 |
| | | | | 705/80 |

(Continued)

OTHER PUBLICATIONS

Radke et al., Image Change Detection Algorithms: A Systematic Survey, IEEE Transactions on Image Processing, vol. 14, No. 3, Mar. 2005. (Year: 2005).*

(Continued)

*Primary Examiner* — Nadja N Chong Cruz
(74) *Attorney, Agent, or Firm* — Brian Restauro; Andrew D. Wright; Roberts Calderon Safran & Cole, P.C.

(57) ABSTRACT

Systems and methods for monitoring of utility assets using crowd-sourced digital image data are disclosed. In embodiments, a method includes: monitoring, by a computing device, incoming real-time utility data; determining, by the computing device, that a triggering event has occurred based on the monitoring; sending, by the computing device, an event message to one or more agent devices comprising a request for digital image collection at a location based on the triggering event, the event message including event information, wherein the one or more agent devices are associated with respective agents in a crowd-sourcing network; receiving, by the computing device, event data from the one or more agent devices, the event data including one or more digital images; and processing, by the computing device, the one or more digital images to determine next steps with respect to the triggering event.

20 Claims, 8 Drawing Sheets

(56) References Cited

U.S. PATENT DOCUMENTS

| | | |
|---|---|---|
| 2016/0219402 A1* | 7/2016 | Zimerman ............ H04W 4/021 |
| 2016/0320435 A1* | 11/2016 | Budhraja .......... H02J 13/00002 |
| 2017/0308834 A1 | 10/2017 | Kim et al. |
| 2017/0365102 A1* | 12/2017 | Huston ................ G02B 27/017 |
| 2018/0136288 A1 | 5/2018 | Wolfe et al. |

OTHER PUBLICATIONS

Harada, "Real-Time Remote Monitoring of Sites and Assets", https://electricenergyonline.com/energy/magazine/1114/article/Real-Time-Remote-Monitoring-of-Sites-and-Assets-Part-I.htm, EE Online, Dec. 29, 2018, 5 pages.

Anonymous, "Using Predictive Analytics to Optimize Asset Maintenance in the Utilities Industry", https://www.cognizant.com/whitepapers/using-predictive-analytics-to-optimize-asset-maintenance-in-the-utilities-industry-codex964.pdf, Cognizant 20-20 Insights, Dec. 2014, 6 pages.

Shang et al., Using Analytics to Optimize Integrated Vegetation Management (IVM) Plan, https://w3-connections.ibm.com/blogs/e3bb01e3-9092-4cae-9658-512ac9b2aba2/entryEE_U_Internal_Blog_Using_Analytics_to_Optimize_Integrated_Vegetation_Management_IVM_Plan?lang=en_us, EE&U Collaboration HUB, Feb. 15, 2018, 3 pages.

Anonymous, "TRACKO Real-time locating and positioning solution", https://www.slideshare.net/OnyxBeacon/tracko-asset-tracking-integrated-solution?from_action=save, Onyx Beacon, accessed Jun. 11, 2019, 14 pages.

Goldsmith, "Aerial drones: the future of asset inspection", https://utilitymagazine.com.au/aerial-drones-the-future-of-asset-inspection/, Feb. 1, 2015, 25 pages.

\* cited by examiner

MONITORING UTILITY ASSETS USING CROWD-SOURCED DIGITAL IMAGE DATA

BACKGROUND

The present invention relates generally to utility asset monitoring and, more particularly, to the monitoring of utility assets using crowd-sourced digital image data.

Typically, a utility company regulates activities related to a public service and maintains infrastructure for the public service, such as the supply of electricity, natural gas or water. In general, utility companies monitor assets utilized in the implementation of the public service regularly, based on a time schedule. Typically, types of monitoring include: regular monitoring, wherein a utility crew visits asset locations and monitors the assets physically at scheduled times; and emergency monitoring, wherein the utility crew visits the asset locations at critical situations and sends or provides details to a control center.

SUMMARY

In an aspect of the invention, a computer-implemented method includes: monitoring, by a computing device, incoming real-time utility data; determining, by the computing device, that a triggering event has occurred based on the monitoring; sending, by the computing device, an event message to one or more agent devices comprising a request for digital image collection at a location based on the triggering event, the event message including event information, wherein the one or more agent devices are associated with respective agents in a crowd-sourcing network; receiving, by the computing device, event data from the one or more agent devices, the event data including one or more digital images; and processing, by the computing device, the one or more digital images to determine next steps with respect to the triggering event.

In another aspect of the invention, there is a computer program product including a computer readable storage medium having program instructions embodied therewith. The program instructions are executable by a computing device to cause the computing device to: monitor incoming utility data; determine that a triggering event has occurred based on the monitoring; determine that the triggering event is eligible for crowd sourcing based on determined aspects of the triggering event; send an event message to one or more agent devices comprising a request for digital image collection at a location based on the triggering event and the determination that the triggering event is eligible for crowd sourcing, the event message including event information, wherein the one or more agent devices are associated with respective agents in a crowd-sourcing network; receive event data from the one or more agent device, the event data including one or more digital images; and process the one or more digital images to determine next steps with respect to the triggering event.

In another aspect of the invention, there is a system including a processor, a computer readable memory and a computer readable storage medium associated with a computing device; program instructions to monitor incoming utility data; program instructions to determine that a triggering event has occurred based on the monitoring; program instructions to send an event message to one or more agent devices comprising a request for digital image collection at a location based on the triggering event, the event message including event information, wherein the one or more agent devices are associated with respective agents in a crowd-sourcing network; program instructions to receive, from the one or more agent devices, digital image data for the location; and program instructions to analyze the digital image data, including comparing the digital image data with historic digital image data to determine changes to the location over time that meet a threshold value. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
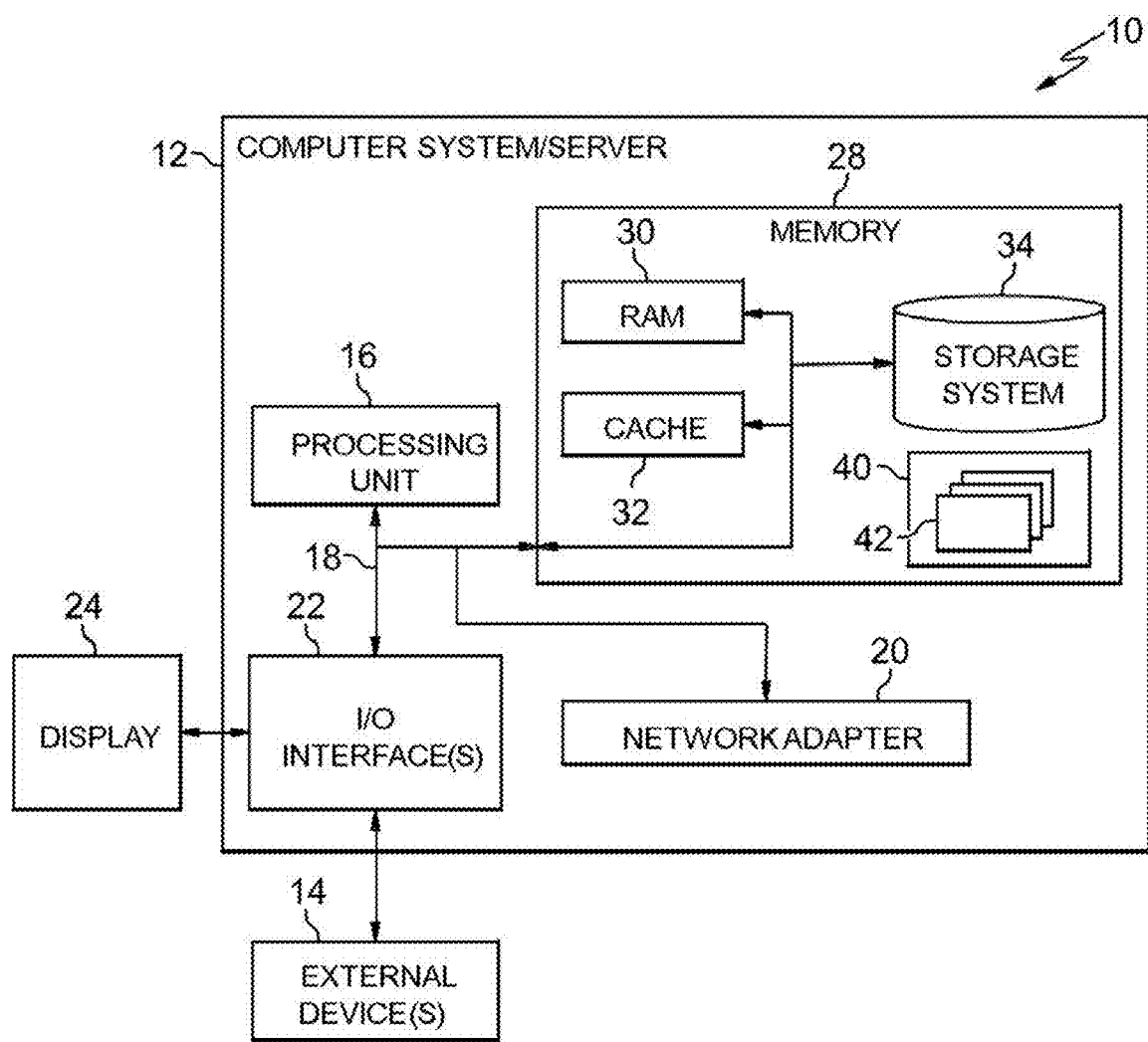
FIG. 1 depicts a computing infrastructure according to an embodiment of the present invention.

The present invention relates generally to utility asset monitoring and, more particularly, to the monitoring of utility assets using crowd-sourced digital image data. In embodiments, a crowd-sourcing model is utilized to obtain, from agent participants, on-demand digital image data of utility assets (e.g., power lines) and vegetation at a location in order to determine a status of the assets/vegetation and determine any steps to be taken at the location based on the status.

Embodiments of the invention utilize crowd sourcing to obtain on-demand visuals (e.g., videos and photographs) of utility assets and nearby vegetation (e.g., trees) in a predefined format from autonomous vehicles (e.g., ground, water, air or amphibious vehicles) and/or human participants. In aspects, a method is provided to determine when crowd sourcing is appropriate for a given event. In implementations, a precision framework is used to process the visuals at a remote control center (e.g., cloud-based server) to determine potential threats from vegetation or foreign object-related hazards. In aspects, the precision framework employs image segmentation on multi-temporal images to efficiently perform visual analytics. In implementations, a cognitive engine is utilized to understand visual patterns of digital images and to predict incidents or hazards based on the digital images provided by the autonomous vehicles and/or participants. Implementations of the invention utilize a method for end users to contribute to the system by performing video capture for assessment purposes, wherein the system accurately identifies specific parts of an asset or assets that need to be captured in video images, and at what angle. Such a method is not only more efficient than manual monitoring methods, but also results in a rapid turn-around time between a need for information and obtaining the information needed.

Advantageously, embodiments of the invention enable utility companies to remotely monitor asset health and tree growth without having to send crews of workers, leading to significant cost and time savings. In aspects, skilled labor is deployed to perform priority tasks. In implementations, a cognitive engine provides the capability to predict accidents/hazards automatically as a result of tree growth and asset malfunctioning, leading to significant cost savings. Moreover, aspects of the invention utilize an automated reward mechanism for autonomous vehicles and/or participants in the form of carbon credits or other reward to incentivize participation in a crowd-sourcing network.

Thus, embodiments of the invention provide a technical solution to the problem of predicting accidents or hazards by providing a system that analyzes image data obtained by one or more agents participating in a crowd-sourcing network. Aspects of the invention utilize unconventional steps of determining agents to contact for a particular triggering event, sending the agents instructions regarding images to capture at a location, and analyzing images received from the agents to determines a status of the location. Moreover, implementations of the invention constitute improvements in the technical field of utility asset monitoring and management by enabling monitoring of real-time data to initiate crowd-sourced image gathering for one or more assets of a utility.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
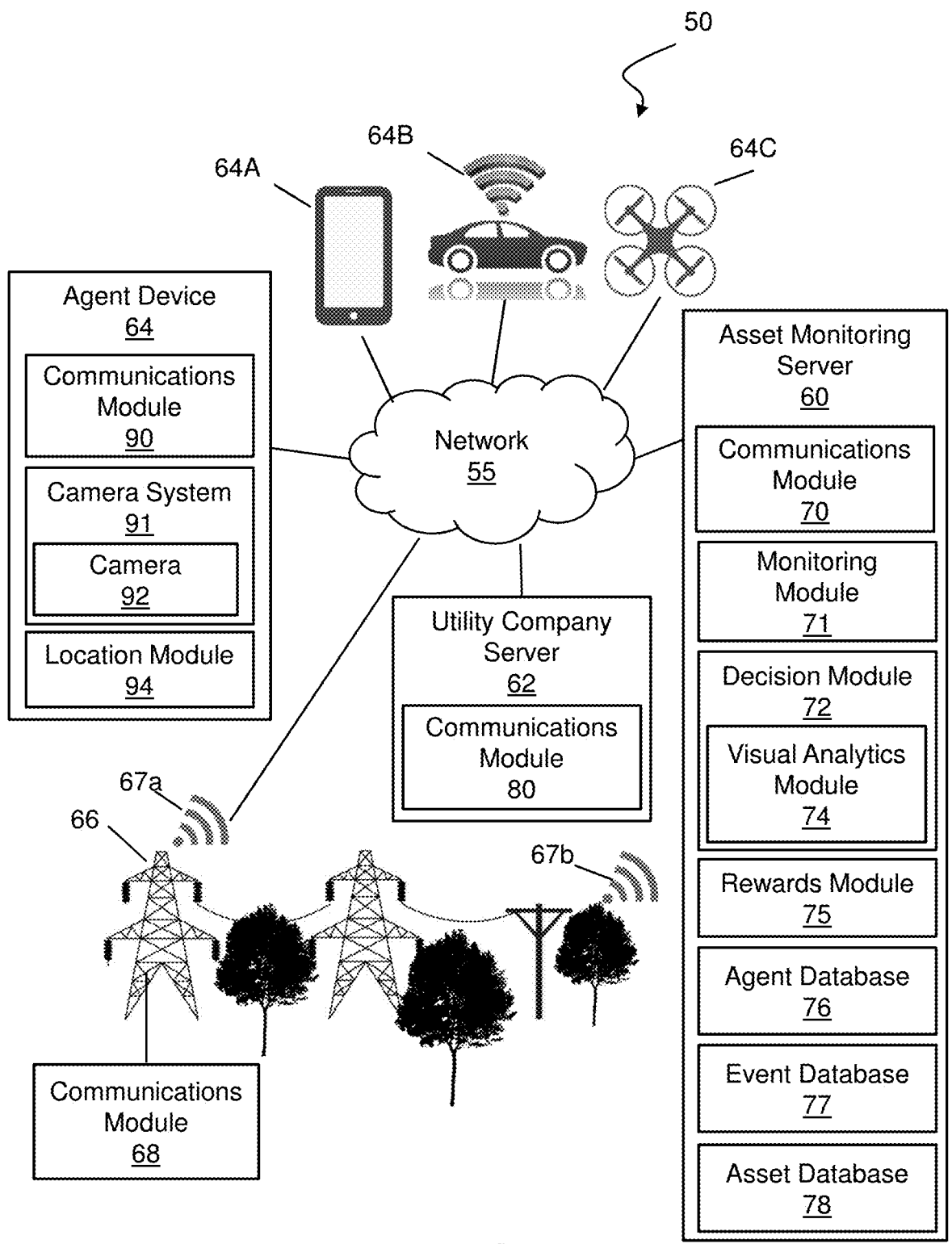
FIG. 2 shows an exemplary environment in accordance with aspects of the invention.

FIG. 2 shows an exemplary utility monitoring environment 50 in accordance with aspects of the invention. The utility monitoring environment 50 includes a network 55 connecting an asset monitoring server 60 with one or more of: a utility company server 62, one or more agent devices 64, and one or more utility assets 66. The asset monitoring server 60 may comprise elements of the computer system 12 of FIG. 1, and may be connected to the network 55 via the network adapter 20 of FIG. 1. In implementations, the asset monitoring server 60 is configured as a special purpose computing device that is part of a utility infrastructure. For example, the asset monitoring server 60 may be configured to receive information from one or more sensors 67A and 67B, or on or more communication modules 68 of an asset 66, as well as image data from multiple agent devices 64, such as a mobile device 64A, a vehicle 64B, or a drone 64C. In embodiments, the asset monitoring server 60 is a cloud-based server providing utility monitoring services for a utility (e.g., an electric utility company). In alternative embodiments, the asset monitoring server 60 is implemented by a utility as part of their infrastructure.

The network 55 may be any suitable communication network or combination of networks, such as a local area network (LAN), a general wide area network (WAN), and/or a public network (e.g., the Internet). The agent device 64 may include the elements of the computing device 12, and may be a desktop computer, laptop computer, tablet computer, smartphone, smart vehicle, vehicle controller (e.g., drone controller), or other computing device configured to exchange information of the present invention with the asset monitoring server 60. In embodiments, the agent device 64 runs an application program that provides an interface by which a participant may communicate information to the asset monitoring server 60. In implementations, the asset monitoring server 60 is configured to communicate with plural different agent devices 64 simultaneously.

Still referring to FIG. 2, the asset monitoring server 60 includes one or more program modules (e.g., program module 42 of FIG. 1) executed by the asset monitoring server 60 and configured to perform functions described herein. In embodiments, the asset monitoring server 60 includes one or more of the following: a communications module 70 configured to enable the exchange of information between the asset monitoring server 60 and various elements of the utility monitoring environment 50; a monitoring module 71 configured to monitor utility data and agents, and determine when a triggering event has occurred; a decision module 72 including a visual analytics module 74 configured to determine crowd-sourcing events and analyze digital image data to determine actions to be taken in response to the triggering event; and a rewards module 75 configured to automatically determine and issue rewards to participants based on stored rules.

In implementations, the asset monitoring server 60 includes one or more of the following: an agent database 76 configured to store data related to participants/agents, an event database 77 for storing digital images and other information collected in accordance with embodiments of the invention, and an asset database 78 configured to store data related to one or more assets of the utility being monitored.

With continued reference to FIG. 2, in embodiments, the utility company server 62 includes elements of the computer system 12 of FIG. 1, and may be a laptop, desktop, or hand-held computing device, for example. In implementations, the utility company server 62 includes a communications module 80 configured to enable the exchange of information (e.g., notifications) between the utility company server 62 and the communications module 70 of the asset monitoring server 60.

The one or more agent devices 64 (hereinafter agent device 64) each include one or more program modules (e.g., program module 42 of FIG. 1) configured to perform functions described herein. In embodiments, the agent device 64 includes one or more of the following: a communications module 90 configured to enable the communication of information between the agent device 64 and the communications module 70 of the asset monitoring server 60; a camera system 91, including a camera 92, configured to capture and store digital images (e.g., still or video images); and a location module 94 configured to obtain location data (e.g., global positioning system data) regarding the agent device 64 and share the location data with the asset monitoring server 60. Although the camera 92 is shown as part of the agent device 64, in embodiments the camera 92 is remote from the agent device 64 but configured to share image data (e.g., digital images or digital video data) with the agent device 64 through wireless or wired communication.

In embodiments, the asset monitoring server 60 may include additional or fewer components than those shown in FIG. 2. In embodiments, separate components may be integrated into a single computing component or module. Additionally, or alternatively, a single component may be implemented as multiple computing components or modules. Additionally, the quantity of devices and/or networks in the utility monitoring environment 50 is not limited to what is shown in FIG. 2. In practice, the utility monitoring environment 50 may include additional devices and/or networks; fewer devices and/or networks; different devices and/or networks; or differently arranged devices and/or networks than illustrated in FIG. 2.

Figure 3:
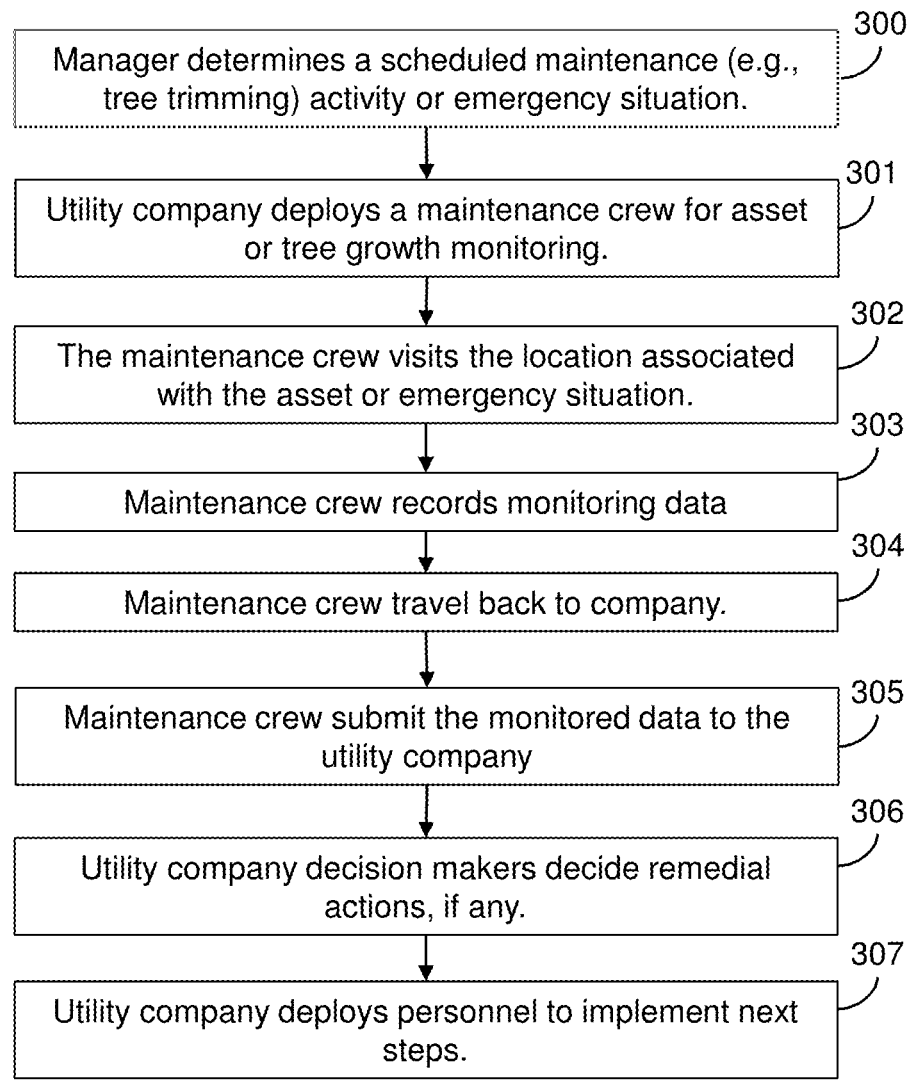
FIG. 3 shows a flowchart of an exemplary manual utility monitoring process.

FIG. 3 shows a flowchart of an exemplary manual utility monitoring process. More specifically, FIG. 3 illustrates an exemplary electric utility monitoring process.

At step 300, a manager of a utility company determines that a scheduled maintenance activity is due, or that an emergency has occurred. This may be based on a calendared maintenance schedule, for example.

At step 301, the utility company deploys a maintenance crew for asset or tree growth monitoring based on the determined scheduled maintenance activity or emergency situation.

At step 302, the maintenance crew visits the location of the asset or emergency. For example, the maintenance crew may visit a location with power lines to determine, based on the scheduled maintenance activity, whether trees in the vicinity of the power lines need to be trimmed.

At step 303, the maintenance crew records monitoring data. Monitoring data may include conditions found at the location. Typically, the monitoring data comprises observations, such as visual observations regarding repairs that are needed or vegetation that needs to be trimmed or removed from an area around an asset (e.g., power lines). The monitoring data may include manual or machine-based recordings performed by the maintenance crew.

At step 304, the maintenance crew travels back to the utility company or related facility. Typically, the maintenance crews are deployed using conventional vehicles.

At step 305, the maintenance crew submits the monitoring data to the utility company. The monitoring data may be in the form of hand-written or digital notes.

At step 306, one or more decision makers at the utility company make decisions based on the monitoring data, including determining remedial actions needed.

At step 307, the utility company deploys one or more personnel to implement the remedial actions to be take. This may be in the form of deploying maintenance crews to trim trees or to repair an asset, for example.

In the method of FIG. 3, at least two deployments of maintenance crews are needed: a first deployment to obtain monitoring data, and a second deployment to implement any desired remedial actions. The costs to the utility company every time a maintenance crew is deployed is significant. Accordingly, it would be desirable to avoid unnecessary deployments of utility crews, especially for regular maintenance and monitoring situations.

Figure 4:
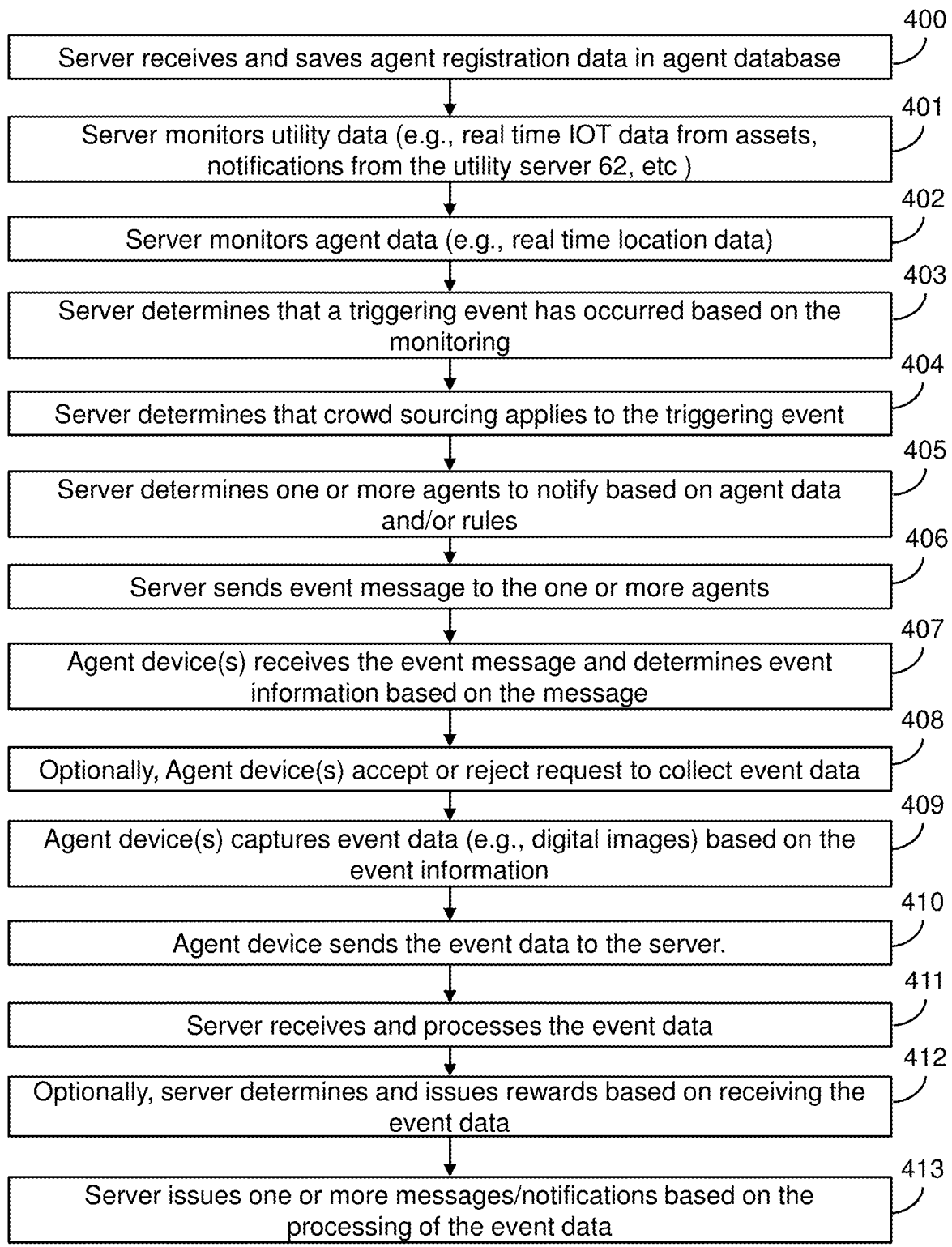
FIG. 4 shows a flowchart of steps of a crowd-sourced utility monitoring method in accordance with aspects of the invention.

FIG. 4 shows a flowchart of steps of a crowd-sourced utility monitoring method in accordance with aspects of the invention. Steps of the method of FIG. 4 may be performed in the environment illustrated in FIG. 2 and are described with reference to elements shown in FIG. 2. Embodiments of FIG. 4 provides an alternative to the manual utility monitoring process of FIG. 3, which results in lower costs to utility companies by eliminating unnecessary deployment of utility employees.

At step 400, the asset monitoring server 60 (hereafter server 60) receives and saves agent registration data in the agent database 76. The term agent as used herein refers to a human crowd-sourcing participant in the utility monitoring environment 50 (network). Each agent is associated with at least one agent device 64 to perform data gathering in accordance with method steps of the present invention described below.

At step 401, the server 60 monitors utility data. In implementations, the monitoring module 71 monitors real-time utility data obtained from one or more of: a utility company server 62, utility assets 66 or an agent device 64. Examples of utility data include sensor data, reports or alerts initiated by a utility company, reports or alerts initiated by an agent (participant) of the utility monitoring environment 50, or combinations thereof. In aspects, one or more internet-of-thing (JOT) sensors (e.g., asset sensors 67A or tree growth sensors 67B of FIG. 2) associated with one or more utility assets 66 automatically send utility data regarding a status of the one or more utility assets 66 to the server 60 (on a periodic or continuous basis) for monitoring by the monitoring module 71. In aspects, the monitoring module 71 accesses stored rules defining categories of events, such as scheduled maintenance events, emergency events, or other types of events related to the utility. In implementations, the utility data comprises a notification from the utility server 62, such as a notification that scheduled maintenance is due for a particular asset.

At step 402, the server 60 monitors agent data from one or more agent devices 64. In implementations, the agent data comprises location data (e.g., global positioning data) associated with a current location of the agent device 64. In embodiments, the agent data includes information regarding a status of the agent, such as "on-duty" or "available", or "off-duty" or "unavailable".

At step 403, the server 60 determines that a triggering event has occurred based on the monitoring of the utility data. In implementations, the monitoring module 71 of the server 60 determines a triggering event based on matching utility data with stored monitoring rules defining a plurality of triggering events. For example, the server 60 may determine that a notification from the utility server 62 indicating that maintenance is due for an asset 66 is a triggering event based on stored monitoring rules. In another example, the server 60 may determine that sensor data from an asset 66 indicates that the asset 66 is malfunctioning, wherein the presence of a malfunction is a triggering event according to the stored monitoring rules. In embodiments, the server 60 determines that a triggering event has occurred based on a user manually reporting a triggering event.

At step 404, the server 60 determines that crowd sourcing applies to the triggering event based on stored monitoring rules. In embodiments, the monitoring module 71 of the server 60 implements step 404. For example, the monitoring rules may provide a list of triggering events that are authorized to be addressed by crowd sourcing steps of the invention (e.g., general maintenance events), and may also provide a list of triggering events that are not authorized to be address by the crowd sources steps (e.g., emergencies or other time-sensitive events).

At step 405, the server 60 determines one or more agents to notify for the triggering event of step 403 based on the agent data of step 402 and/or stored rules. For example, the agent data may indicate that a certain agent is only available during particular time periods, for particular geographic regions, or for particular types of triggering events. In aspects, the server 60 obtains real-time location data (agent data) from one or more agent devices 64, and utilizes the real-time location data to determine one or more of the agents that are available to assist with the triggering event based on their location and the location associated with the triggering event (e.g., location of an asset). For example, in implementations the server 60 determines one or more agents who are within a predetermined distance from a location associated with the triggering event, wherein agents outside of the predetermined distance are not contacted by the server 60. In implementations, the decision module 72 implements step 405.

At step 406, the server 60 generates and sends an event message requesting the collection/recording of event data (e.g., visual image collection) to respective agent devices 64 of the one or more agents determined at step 405. The event messages may be the same for every agent or may be tailored for each particular agent. In implementations, the event message includes event data for an agent, including one or more of: a location of an asset or object to be imaged, images to be captured (e.g., photographs of the trees), and formatting requirements (e.g., Camera Image File Format). In aspects, the decision module 72 of the server 60 implements step 406.

At step 407, the one or more agent devices 64 receive the event message from the server 60 and determine event information from the event message. The event information may include the location of an asset, images to be captured, and formatting requirements for the images, for example.

Optionally, at step 408, one or more agents accept or reject a request to collect/record event data based on the received event message of step 407. In implementations, the event message includes selectable options to accept or reject a request to collect/record event data (e.g., image data), and the agent selection is communicated back to the server 60. In embodiments, the server 60 records one or more agents who have elected to participant based on receiving a selection from the one or more agents to participate (i.e., record event data).

At step 409, the one or more agent devices 64 capture event data during data recording event at a location provided by the server 60 based on the event information determined at step 407. In implementations, the event data is in the form of digital images (e.g., still images or video images). The event data may include other data, such as observational data, sensor data, audio data, or other data related to the data recording event. In one example, an agent device 64 travels to a location of an asset designated in an event message received from the server 60, and records digital images of objects designated in the event message (e.g., vegetation, the asset, and/or surrounding objects) using the camera system 91 of the agent device 64.

At step 410, the one or more agent devices 64 send the event data captured during the data recording event of step 408 to the server 60. The agent device(s) 64 may communicate the event data to the server 60 utilizing wireless or wired connections. In one example, the communications module 90 of the agent device 64 formats the event data into a desired format, as needed, and sends the event data through the network 55 (e.g., internet) to the communications module 70 of the server 60.

At step 411, the server 60 receives and processes the event data sent by the one or more agent devices 64 and processes/analyses the event data. The manner in which event data may be analyzed is discussed in more detail below with respect to FIG. 6. In implementations, the communications module 70 of the server 60 collects event data from one or more agent devices 64 for a particular location/event, sends the event data to the decision module 72 for analysis, and stores processed and/or unprocessed event data (e.g., digital images) in the event database 77. In aspects, the server 60 analyzes the event data to determine a status of the objects or assets at the location of the data recording event. In embodiments, the server 60 compares collected image data with historic image data to determine changes to the location over time that meet a threshold value. For example, the server 60 may analyze image data to determine that trees at a location have grown over time in a manger that meets a threshold value (e.g., trees are within a predetermined distance from an electric power line).

Optionally, at step 412, the server 60 determines and issues one or more rewards based on event data received at step 411. In embodiments, the server 60 receives acceptable event data at step 411, associates the event data received with the agent who sent the event data, and issues a reward to the agent based on information stored in the agent database 76. For example, the server 60 may determine that an agent responded to an event message by providing digital images which meet requirements of the event message (e.g., formatting requirements, images requested, etc.), and may issue the agent coupons, monetary rewards, discount offers, promotional materials, or other rewards according to predetermined rules stored in the agent database 76.

At step 413, the server 60 issues one or more messages or notification based on the processed/analyzed event data of step 411. The messages or notification may be any message or notification based on the processing/analysis of the event data at step 411, such as instructions to address one or more maintenance requirements identified by the server 60.

Figure 5:
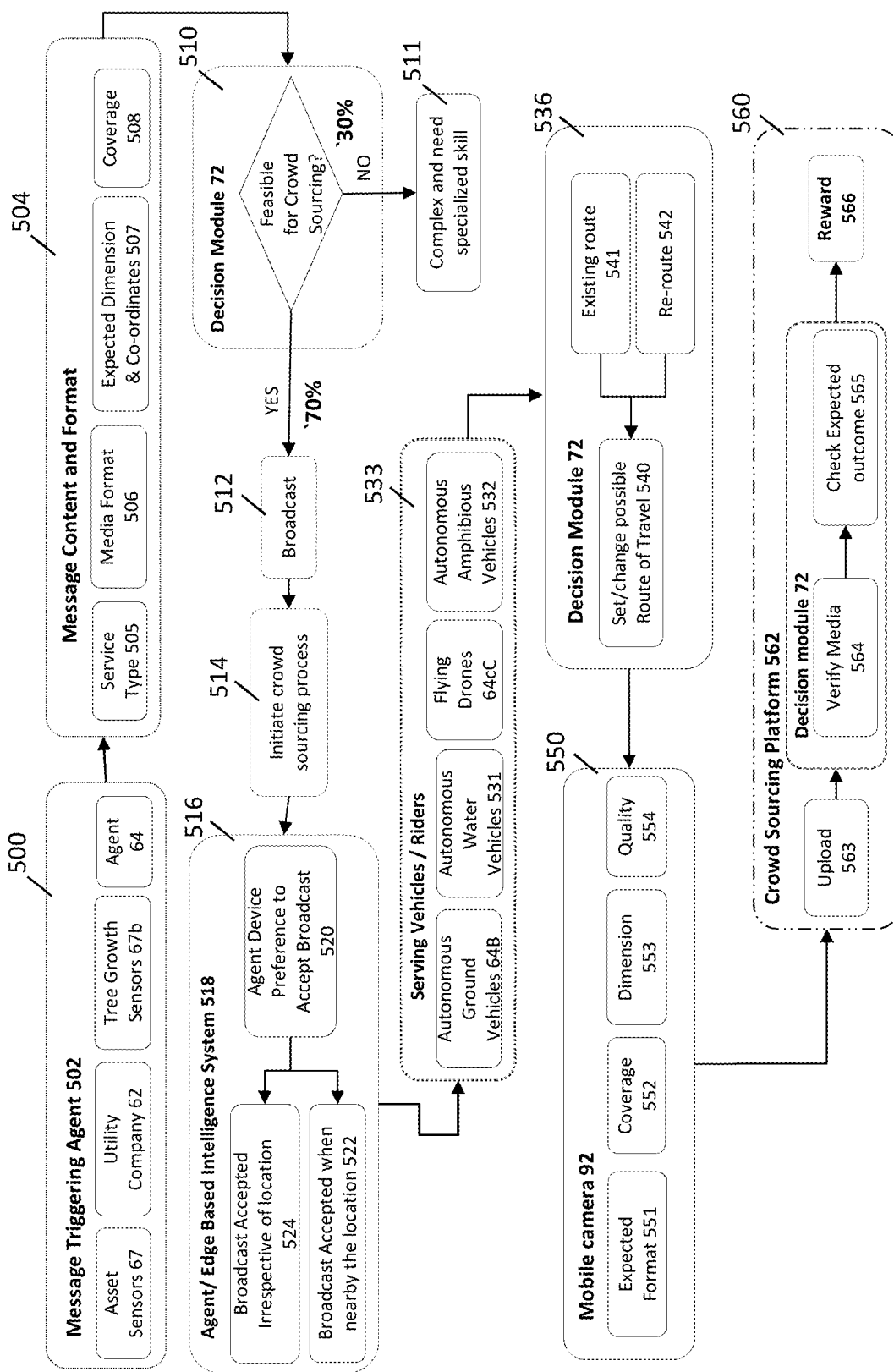
FIG. 5 shows a flow diagram in accordance with the method of FIG. 4.

FIG. 5 shows a flow diagram in accordance with the method of FIG. 4. Steps illustrated in FIG. 5 may be performed in the environment illustrated in FIG. 2 and are described with reference to elements shown in FIG. 2.

In accordance with the embodiment of FIG. 5, at step 500 a message triggering agent 502 of the monitoring module 71 determines a triggering event in accordance with step 403 of FIG. 4 based on utility data obtained from one or more sources, such as asset sensors 67A, tree growth sensors 67B, a utility company/server 62 or an agent (agent device 64). At step 504, the monitoring module 71 then determines a format and contents of an event message to be sent to participating agents based on the triggering event. The contents and format of the message may be generated using stored rules of the monitoring module 71 based on, for example, a type of service needed (service type 505), a desired media format 506, a location of a data recording event 507 (e.g., dimensions and coordinates), and the coverage desired 508 (e.g., data to be recorded including objects to be imaged, angles of images desired, etc.).

At step 510 the decision module 72 determines if the triggering event at issue is one that is appropriate for crowd sourcing functions of the invention based on predetermined rules. For example, the decision module 72 may determine that the triggering event has a crowd source rating of 30% based on determined aspects of the triggering event (e.g., time sensitivity, location of the triggering event, nature of the triggering event, etc.). In the example of FIG. 5, the decision module 72 determines at step 511 that the triggering event is not appropriate for crowd sourcing functions of the present invention because the triggering event is complex in nature and requires specialized skills to address. In this example, the decision module 72 issues an appropriate notification (not shown) based on the determination (e.g., sends a notification to an expert or the utility company server 62 that the triggering event is one that needs to be addressed by a specialist). In another example, the decision module 72 determines that the triggering event has a crowd source rating of 70% based on the determined aspects of the triggering event. In this example, the decision module 72 determines that the triggering event is appropriate for crowd sourcing functions of the present invention and generates an event message for broadcasting at step 512.

At step 514, the decision module 72 initiates a crowd sourcing process by issuing or broadcasting the event message to one or more agent devices 64 based on predetermined rules and/or agent data in the agent database 76. For example, the decision module 72 may send the event message to agents who are within a predetermined distance from the location of the triggering event, agents who are determined to be currently available, and/or agents who are listed as having skills associated with the triggering event.

At step 516, an agent or edge-based intelligence system 518 of the agent device 64 processes the event message sent by the server 60. In aspects, the agent device 64 includes predetermined preferences to accept or reject an event message (broadcast) as indicated at 520. The predetermined preferences may include preferences for particular types of triggering events, time or calendar preferences, formatting preferences (e.g., camera requirements), or other preferences related to a triggering event. In implementations, an agent device 64 may automatically accept or reject an event message based on the current location of the agent device 64 with respect to the location of the data recording event set forth in the event message, as indicated at 522. Conversely, the agent device 64 may include rules to accept an event message (broadcast) irrespective of the location as indicated at 524.

In embodiments, the agent devices 64 contacted by the server 60 include one or more smart vehicles or controllers of vehicles, including for example, autonomous ground vehicles 64B, autonomous water vehicles 531, flying drones 64C and autonomous amphibious vehicles 532, as indicated at 533. In such embodiments, the vehicles may be automatically directed by the server 60 to a data recording location based on the triggering event, in order to autonomously or automatically collect image data for the location. In embodiments indicated at 536, the decision module 72 sets or changes a route for one or more participating vehicles to travel at step 540 by determining existing travel routes of the vehicles at step 541 and rerouting the vehicles at step 542 based on information of the triggering event.

Still referencing FIG. 5, at step 550 a camera 92 associated with the agent device 64 captures image data based on information in the event message from the server 60. The camera 92 may be part of an autonomous vehicle system, such as a camera of an autonomous ground vehicle 64B, an autonomous water vehicle 531, a flying drone 64C or an autonomous amphibious vehicle 532. In implementations, the camera 92 automatically takes images at a location designated in the event message. For example, still and/or digital images may be taken in a format designated by the server (expected format 551), with desired coverage 552, having desired dimensions 553 and within desired quality parameters 554 (e.g., pixel level).

At step 560 a crowd sourcing platform 562 of the server 60 uploads event recording data from agent devices 64 at 563, and the decision module 72 processes and analyzes the uploaded event recording data. In implementations, the decision module 72 first verifies the event recording data (media) at 564. In aspects, verification of the event data comprises verifying that the event data is in the proper format and has a high enough quality to enable computer-based digital image analysis of the event data. If the event recording data is verified, the decision module 72 then analyzes the event recording data at 565 to determine a status of asset or objects at the location, a predicted outcome, or remedial actions to be taken. In implementations, the server 60 determines if a reward should be issued to an agent at step 566.

With reference back to FIG. 2, an exemplary scenario will now be discussed in accordance with the flow diagram of FIG. 5. In this exemplary scenario, an energy utility company broadcasts, through the server 60, an event message to agent devices 64A-64C to monitor a specified asset 66 and surrounding trees indicated at 100. An automated vehicle and rider represented at 64B receives the broadcast message with relevant details. The automated vehicle 64B is on-route to the location of the asset 66 and decides to capture the visuals (images) of the asset 66 and trees 100. The automated vehicle 64B captures the visuals in a format specified by the utility company (server 60) and sends the visuals (images) to the server 60. The server 60 uploads the visuals to the crowd-sourcing platform of the server 60 (e.g., decision module 72). The crowd-sourcing platform of the server 60 analyzes the visuals (images), determines next steps to be taken based on the analysis, and sends notification regarding the determinations to the utility company (e.g., the utility company server 62.

Figure 6:
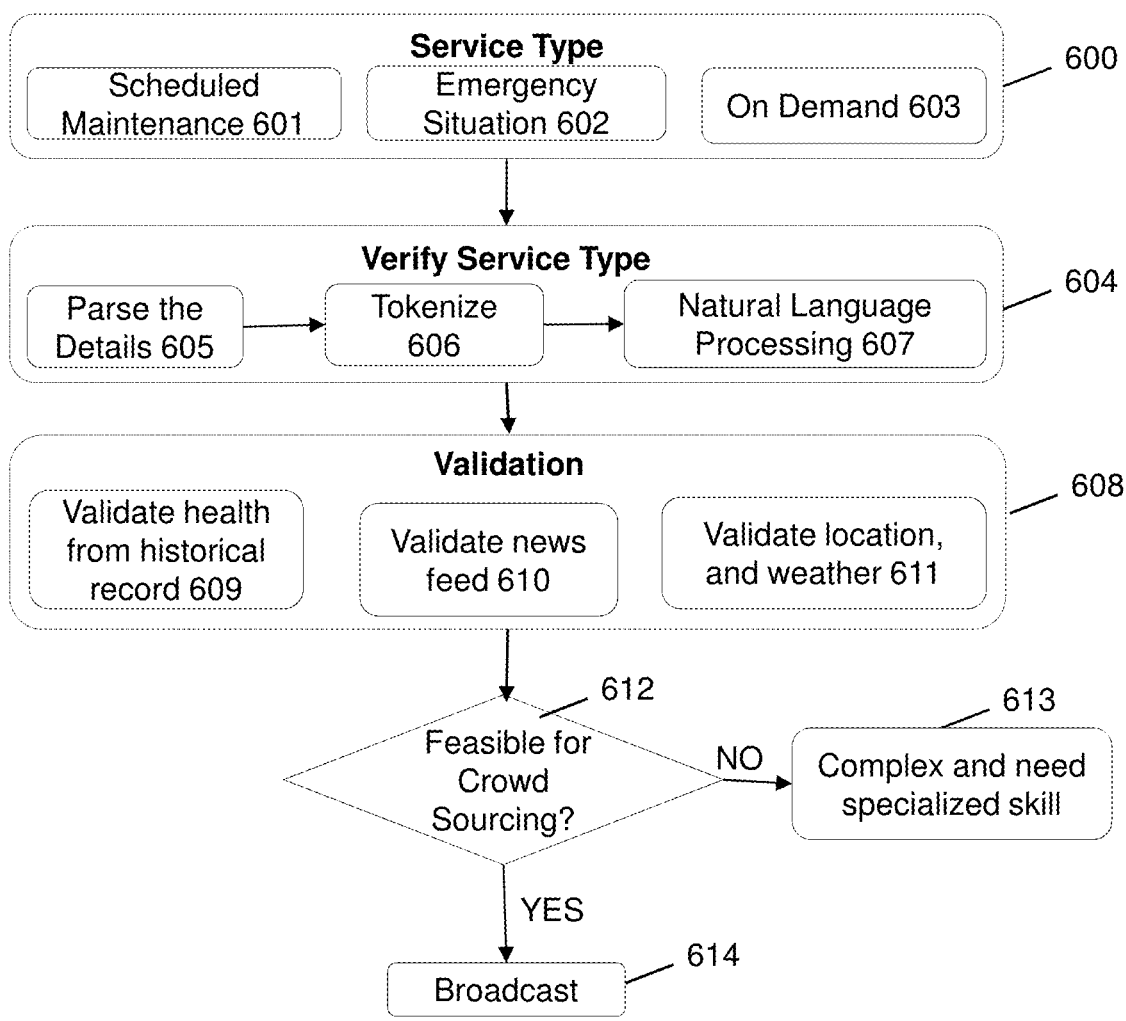
FIG. 6 shows a flow diagram of an exemplary broadcasting method in accordance with aspects of the invention.

FIG. 6 shows a flow diagram of an exemplary broadcasting method in accordance with aspects of the invention. As depicted in FIG. 6, at step 600 the server 60 determines that a triggering event has occurred, wherein the triggering event may be, for example, scheduled maintenance 601, an emergency situation 602, or an on-demand event 603. At step 604, the server 60 verifies the service type of the triggering event by parsing the details of received utility data (e.g., text-based data) at 605, tokenizing the parsed data at 606, and performing natural language processing on the tokenized data at 607. In this example, the utility data may be a triggering event message sent by the utility company server 62 or metadata transmitted with sensor data (e.g., sensors 67A, 67B) from an asset 66.

With continued reference to FIG. 6, at step 608 the server 60 validates the utility data. For example, the server 60 may validate the health of an asset at 609 based on a comparison of the utility data received and historic asset records in the asset database 78. For example, the server 60 may determine that parameters of sensor data from an asset 66 are within acceptable levels of deviation from historic parameters in the asset database 78. Conversely, the server 60 may determine that the parameters are outside acceptable limits based on a comparison of the utility data with historic asset data in the asset database 78. In implementations, the server 60 validates the news feed (source of utility data) at 610. For example, the server 60 may give different priority ratings or confidence scores to utility data received from different sources. In this example, utility data received from a utility company server 62 may be given a priority status and automatically validated, wherein utility data received from an agent device 64 may be given a lower priority or require additional validating steps to verify the identity of the agent. In embodiments, at 611 the sever 60 validates the location or weather determined from the utility data. For example, the server 60 may determine that a location of a triggering event (e.g., a location that may require routine tree-trimming maintenance) is associated with dangerous weather conditions (e.g., rain, sleet, snow, etc.) and therefore is not validated until weather conditions for the location are acceptable (e.g., acceptable for image capturing by the camera 92 of the agent device 64). In another example, the location may be inaccessible to agents based on recorded event data in a calendar or the like (e.g., road closures make the location inaccessible to vehicles).

At step 612 the server 60 determines if data gathering for the triggering event can be accomplished using crowd sourcing based on predetermined rules. If the triggering event does not qualify as indicated at step 613, then the server 60 does not broadcast an event message or request for services to agent devices 64. Conversely, if the server 60 determines that the triggering event does qualify at step 612, then the event message may be broadcast to one or more agent devices 64 at step 614.

Figure 7:
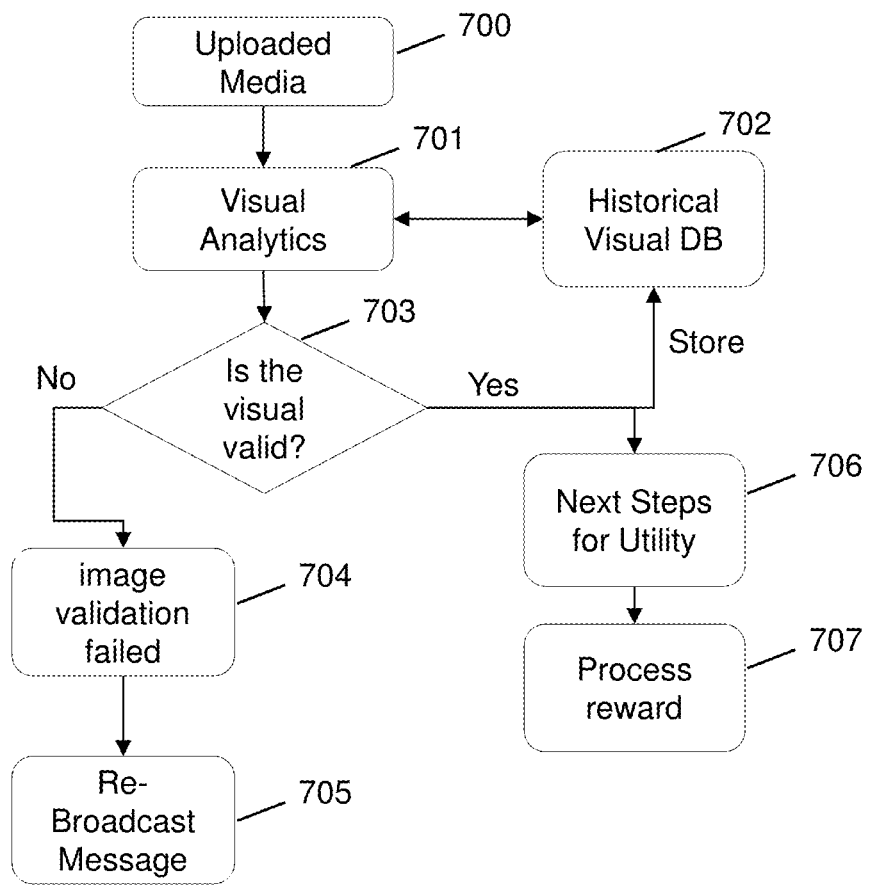
FIG. 7 shows a flow diagram of an exemplary image analysis method in accordance with aspects of the invention.

FIG. 7 shows a flow diagram of an exemplary image analysis method in accordance with aspects of the invention. At step 700, the server 60 uploads image data (media) received from one or more agent devices 64 deployed in response to a triggering event (e.g., sensor data indicating a problem with an electric utility asset). At 701, the server 60 performs a visual analytics analysis of the uploaded image data. In implementations, the server 60 compares the image data received with historic images from the event database 77 at step 702. For example, pictures of trees can be compared to historic pictures of the same trees at a location. At step 703 the server 60 determines if the uploaded image data is valid, and if it is, saves the image data in the event database 77 for use in future image analysis. In aspects, if the server 60 determines that the image data is not valid at step 704 (e.g., picture quality is too poor to analyze), the server 60 then re-broadcasts the original event message to one or more agents at step 705 in order to deploy agents to obtain valid image data for the triggering event. If the image data is valid, the server 60 analyzes the image data to determine next steps at 706, such as remediation steps to be conducted by the utility company, and optionally determines rewards at step 707 for agents supplying valid image data to the server 60.

Figure 8:
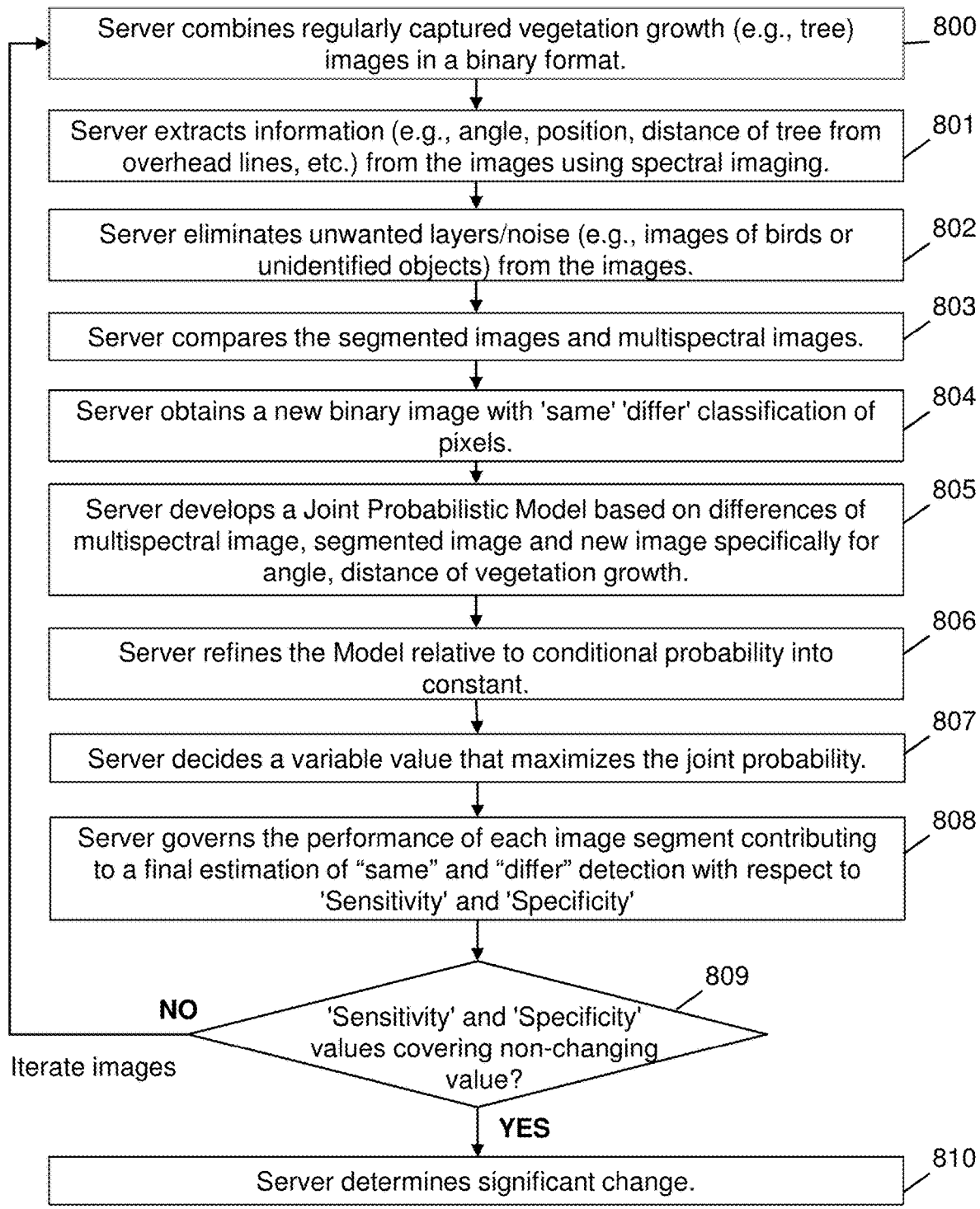
FIG. 8 shows a flowchart of steps of a vegetation growth analytics method in accordance with aspects of the invention.

FIG. 8 shows a flowchart of steps of a vegetation growth analytics method in accordance with aspects of the invention. In embodiments, agents obtain image data of vegetation (e.g., trees) at locations associated with a utility asset (e.g., near power lines, etc.) in order to maintain proper working and safety conditions. In such embodiments, the server 60 may perform the following analysis. In implementations the visual analytics module 74 of the server 60 performs one or more of the steps of FIG. 8.

At step 800, the server 60 combines regularly captured vegetation growth images (hereafter images) in a binary format in the asset database 78. This may include images collected on a routine or on-demand basis from one or more agent devices 64 in a variety of formats. In embodiments, the server 60 creates binary images from color images by segmentation. The term segmentation refers to a process of assigning each pixel in a source image to two or more classes. In implementations, the images are each segmented to produce images with different classifications of pixels.

At step 801, the server 60 extracts information from the images using spectral imaging to generate a multispectral image. In implementations, the information extracted includes one or more of an angle, position, and/or distance of a tree from an object (e.g., overhead lines). The term spectral imaging refers to imaging that uses multiple bands across the electromagnetic spectrum. Spectral imaging may use the infrared spectrum, the visible spectrum, the ultraviolet spectrum, x-rays or a combination of the above.

At step 802, the server 60 eliminates unwanted layers or noise from the images. In general, layers are used in digital image editing to separate different elements of an image. For example, the server 60 may remove images of birds or unidentified objects from the images.

At step 803, the server 60 compares the segmented images (binary images) and the multispectral image to determine differences.

At step 804, the server 60 obtains a new binary image with the same or different classifications of pixels as the original image.

At step 805, the server 60 develops a Joint Probabilistic Model based on differences between the multispectral image, segmented image and the new image. Joint probability is a statistical measure that calculates the likelihood of two events occurring together at the same point in time. In implementations the differences include differences in angle and distance of vegetation growth from an object (e.g., overhead lines).

At step 806, the server 60 refines the Joint Probabilistic Model relative to conditional probability into constant. The term conditional probability refers to a measure of the probability of an event given that another event has occurred.

At step 807, the server 60 decides a variable value that maximizes the joint probability.

At step 808, the server 60 governs the performance of each image segment contributing to a final estimation of 'same' and 'differ' detection with respect to "sensitivity" and "specificity".

At step 809, the server 60 determines if "sensitivity" and "specificity" values cover non-changing values. If yes, the server 60 determines that there is a significant change at step 810. For example, a significant change may be a significant growth of a tree with respect to a power line. If the server determines that "sensitivity" and "specificity" values do not cover non-changing values, then the server 60 continues to monitor incoming images to determine changes to vegetation over time.

An example of calculations performed in accordance with FIG. 8 is provided below. Given $X_1$ and $X_2$ two d-dimensional multispectral remote images of m sections (a section can be configurable in size based on an asset being monitored—it can be defined in sq mm or group of pixels) each acquired over the same geographical area at two different dates.

Let $X_D$ of dimension d be the multispectral difference image obtained from X1 and X2.

$$X_D{}^i = X_1{}^i - X_1{}^i | i = \{1 \ldots d\} \qquad \text{Def(1)}$$

The server 60 can then craft the modulus image from $X_D$ as follows:

$$X = [(X_1{}^i)^2 + (x_1{}^i)^2 + \ldots (X_D{}^d)^2]^{1/2} \qquad \text{Def(2)}$$

Let, B be a set of 's' input segmentations estimated by performing the different imaging routines on X.

$$B = \{B_j : B_{ij} \forall (i=1 \ldots m; j=1 \ldots s)\} \qquad \text{Def(3)}$$

The aim of the proposed method is to estimate, from X and B, a new binary image Y where each section Yi is assigned to one of two information classes, $\{1; 0\} = \{\text{"change"}, \text{"no-change"}\}$. So the server 60 gets, $$Y = \{B_1 \forall (i=1 \ldots m)\} \qquad \text{Def(4)}$$

The class "change" represents the changes that occurred between two acquisition dates of the two multi-temporal images; and "no-change" represents the unchanged areas.

From Def(1), Def(2), Def(3) and Def(4), define the joint probability linking X, Y and B as follow:

$$p(Y,X,B) = P(Y|X,B)p(B|X)p(X)$$

$$\propto p(X|Y)p(X)\Pi_j{}^s p(Y|B_j)\Pi_j{}^s p(B_j|X) \qquad \text{Eq(1)}$$

The server 60 can now associate a real-valued weigh to the conditional probability p(X|Y) over $\{B_j|, \forall_j\}$ $$p(Y,X,B) \propto p(X|Y)^\lambda p(X)\Pi_j{}^s p(Y|B_j)\Pi_j{}^s p(B_j|X) \qquad \text{Eq(2)}$$

where, as X is known and $\{B_j|, \forall j\}$ is obtained from different imaging routines, then, $p(X) \Pi_j{}^s p(B_j|X)$ is a constant, thus, the result is, $$p(Y,X,B) \propto p(X|Y)^\lambda \Pi_j{}^s p(Y|B_j) \propto p(X|Y)^\lambda p(Y|B) \qquad \text{Eq(3)}$$

What is desired is to find out $\hat{Y}$, which maximizes the joint probability, p(Y,X,B), which can be derived to show, $$\hat{Y} = \underset{Y}{\mathrm{argmax}} \{\lambda \log p(X \mid Y) + \log p(Y \mid B)\} \qquad \text{Eq(4)}$$

where,
p(X|Y) stands for the likelihood of a section given the parameters of the class; and,
p(Y|B) stands for the estimation of Y given the imaging routines.

A new binary image Y can be estimated from a set of input routines $B = \{B_j\}$.

$$p(Y|B) \propto p(B|Y)p(Y) = \Pi_i(\Pi_j p(B_{ij}|Y_i) p(Y_i)) \qquad (5)$$

where,
$p(Y_i)$ stands for prior probability of Y,
Since the change detection problem is treated as a binary random variable, the server 60 can derive, $$p(Y_i = 1 \mid B_i) = \frac{p(Y_i = 1, B_i)}{p(B_i)} = \frac{\alpha}{\alpha + \beta} = \omega_i \qquad \text{Eq(6)}$$

$$p(Y_i = 0 \mid B_i) = 1 - \frac{p(Y_i = 1, B_i)}{p(B_i)} = 1 - \frac{\alpha}{\alpha + \beta} = 1 - \omega_i \qquad \text{Eq(7)}$$

with $\alpha$ and $\beta$ are derived under the hypothesis that the imaging routine are generated independently and are defined as follows based on conjoint probabilistic modelling:

$$\alpha = p(B_i|Y_i=1)p(Y_i=1) = \Pi_j p(B_{ij}|Y_i=1)p(Y_i=1) \qquad \text{Eq(8)}$$

$$\ominus = p(B_i|Y_i=0)p(Y_i=0) = \Pi_j p(B_{ij}|Y_i=0)p(Y_i=0) \qquad \text{Eq(9)}$$

Each imaging routine $B_j$ contributes to the final estimation of "change"-"no-change" detection based on its performance in terms of sensitivity denoted by $p_j$, and specificity denoted by $q_j$. Therefore, their likelihood terms are defined as, $$p(B_i|Y_i=1)p_j\delta(B_{ij},1)+(1-p_j)(1-\delta(B_{ij},1)) \quad \text{Eq(10)}$$

$$p(B_i|Y_i=0)q_j\delta(B_{ij},0)+(1-q_j)(1-\delta(B_{ij},0)) \quad \text{Eq(11)}$$

and, the sensitivity denoted by $p_j$, and specificity denoted by $q_j$ are defined as, $$p_j = \frac{\sum_i \delta(B_{ij},1)\delta(Y_i,1)}{\sum_i \delta(Y_i,1)} \quad \text{Eq(12)}$$

$$q_j = \frac{\sum_i \delta(B_{ij},0)\delta(Y_i,0)}{\sum_i \delta(Y_i,0)} \quad \text{Eq(13)}$$

Therefore, $\omega_i$ is a normalized product of $p(Y_i=1)$, which is the prior probability that a section belongs to the class 1, the sensitivity of each imaging routine that leads to a "change" section and the product of the specificity (i.e., 1-sensitivity) of each imaging routine that leads to a "no-change" section.

Embodiments of the invention utilize a cognitive engine to provide the capability to predict any incident based on images (visuals) provided by agents (e.g., autonomous vehicles and/or associated riders). In general, a cognitive engine comprises: a source system, data collection component, data analysis component, data mining component, statistics/monitoring component, and decision-making component. In implementations, a source system includes historical images (visuals) which can be analyzed using visual recognition and video enrichment tools. Visual recognition analyzes an asset or tree image and provides insights into the image content. In general, visual recognition quickly and accurately tags, classifies visual content and utilizes the content to train the server using machine learning. Video enrichment allows extraction of various metadata automatically from videos, including semantic categories, entities and objects. In one example, predictive analytics of the present invention help with tree trimming decision-making based on historical visuals captured through crowd sourcing for a particular asset and surroundings. In another example, predictive analytics of the present invention help with decision-making regarding aging asset replacement.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for monitoring of utility assets using crowd-sourced digital image data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   monitoring, by a computing device, incoming real-time utility data of a utility;
   determining, by the computing device, that a triggering utility event has occurred based on the monitoring the incoming real-time utility data;
   assigning, by the computing device, a rating to the triggering utility event based on: predetermined rules for determining crowd-sourcing eligibility, time sensitivity of the triggering utility event, location of the triggering utility event, and nature of the triggering utility event;
   determining, by the computing device, based on the rating whether the triggering utility event is eligible for crowd sourcing;
   sending, by the computing device in response to determining that the triggering utility event is eligible for crowd-sourcing, an event message to one or more agent devices comprising a request for digital image collection at a location based on the triggering utility event, the event message including event information, wherein the one or more agent devices are associated with respective agents in a crowd-sourcing network;
   receiving, by the computing device, event data from the one or more agent devices, the event data including digital images;
   generating, by the computing device, multispectral images from the digital images using spectral imaging;
   analyzing, by the computing device using visual analytics analysis, the multispectral images to determine differences between historic image data and the multispectral images based on a joint probabilistic model;
   determining, by the computing device, the differences meet a threshold value; and
   issuing, by the computing device, a notification regarding maintenance requirements for the utility based on the determining the differences meet the threshold value.

2. The computer-implemented method claim 1, wherein the event message includes an option to accept or decline the request, the method further comprising receiving, by the computing device, an acceptance of the request from the one of more agent devices.

3. The computer-implemented method of claim 1, further comprising:
   determining, by the computing device, the one or more agent devices to send the event message to from a list of agents of the crowd-sourcing network, the determining the one or more agent devices comprising:
monitoring, by the computing device, real-time location data of the one or more agent devices; and
determining, by the computing device, that the one or more agent devices are within a predetermined distance from the location.

4. The computer-implemented method of claim 1, further comprising determining, by the computing device, the one or more agent devices to send the event message to from a list of agents of the crowd-sourcing network based on agent profile data in an agent database.

5. The computer-implemented method of claim 1, further comprising determining, by the computing device, a reward for the one or more agents based on agent profile data in an agent database and based on the event data.

6. A computer program product comprising a computer readable storage medium having program instructions embodied therewith, the program instructions executable by a computing device to cause the computing device to:
monitor incoming utility data of a utility;
determine that a triggering utility event has occurred based on the monitoring;
assign a rating to the triggering utility event based on: predetermined rules for determining crowd-sourcing eligibility, time sensitivity of the triggering utility event, location of the triggering utility event, and nature of the triggering utility event;
determine whether the triggering utility event is eligible for crowd sourcing based on the rating;
send an event message to one or more agent devices comprising a request for digital image collection at a location based on the triggering utility event and a determination that the triggering utility event is eligible for crowd sourcing, the event message including event information, wherein the one or more agent devices are associated with respective agents in a crowd-sourcing network;
receive event data from the one or more agent devices, the event data including digital images;
generate multispectral images from the digital images using spectral imaging;
determine, using visual analytics analysis, differences between historic image data and the multispectral images based on a joint probabilistic model;
determine the differences meet a threshold value; and
issue a notification regarding maintenance requirements for the utility based on the determining the differences meet the threshold value.

7. The computer program product of claim 6, wherein the event message includes an option to accept or decline the request, and the program instructions further to cause the computing device to determine that an acceptance of the request from the one of more agent devices has been received.

8. The computer program product of claim 6, further comprising program instructions to cause the computing device to determine the one or more agent devices to send the event message to from a list of agents of the crowd-sourcing network, the determining the one or more agent devices comprising:
monitoring real-time location data of the one or more agent devices; and
determining that the one or more agent devices are within a predetermined distance from the location.

9. The computer program product of claim 6, further comprising program instructions to cause the computing device to determine the one or more agent devices to send the event message to from a list of agents of the crowd-sourcing network based on agent profile data in an agent database.

10. The computer program product of claim 6, wherein the program instructions are further executable by the computing device to cause the computing device to: process the event data, wherein the processing the event data comprises:
determining if the digital images are valid based on a format of the digital images and quality of the digital images; and
if the digital images are not valid, re-sending the event message to the one or more agent devices.

11. A system comprising:
a processor, a computer readable memory and a computer readable storage medium associated with a computing device;
program instructions to monitor incoming utility data of a utility;
program instructions to determine that a triggering utility event has occurred based on the monitoring;
program instructions to assign a rating to the triggering utility event based on:
predetermined rules for determining crowd-sourcing eligibility, time sensitivity of the triggering utility event, location of the triggering utility event, and nature of the triggering utility event;
program instructions to determine whether the triggering utility event is eligible for crowd sourcing based on the rating;
program instructions to send an event message to one or more agent devices comprising a request for digital image collection at a location based on the triggering utility event in response to determining that the triggering utility event is eligible for crowd sourcing, the event message including event information, wherein the one or more agent devices are associated with respective agents in a crowd-sourcing network;
program instructions to receive, from the one or more agent devices, digital image data for the location; and
program instructions to generate multispectral images from the digital images using spectral imaging;
program instructions to analyze the multispectral images using visual analytics analysis, including comparing the multispectral images with historic digital image data to determine changes to objects at the location over time that meet a threshold value based on a joint probabilistic model; and
program instructions to issue a notification regarding maintenance requirements for the utility based on the determining the differences meet the threshold value,
wherein the program instructions are stored on the computer readable storage medium for execution by the processor via the computer readable memory.

12. The system of claim 11, further comprising program instructions to determine next steps with respect to the triggering utility event based on the analysis of the digital image data.

13. The system of claim 11, wherein the event message includes an option to accept or decline the request, and the system further comprises program instructions to determine that an acceptance of the request from the one of more agent devices has been received.

14. The system of claim 11, further comprising program instructions to determine the one or more agent devices to send the event message to from a list of agents of the crowd-sourcing network, the determining the one or more agent devices comprising:
    monitoring real-time location data of the one or more agent devices; and
    determining that the one or more agent devices are within a predetermined distance from the location.

15. The system of claim 11, further comprising program instructions to determine the one or more agent devices to send the event message to from a list of agents of the crowd-sourcing network based on agent profile data in an agent database.

16. The system of claim 11, further comprising program instructions to determine a reward for the one or more agents based on agent profile data in an agent database and based on the receiving the digital image data.

17. The system of claim 11, wherein the event information includes one or more of the group consisting of: coordinates, a desired angle of an image, a target for the image collection, a desired digital image format, and a service type associated with the triggering utility event.

18. The method of claim 1, wherein the visual analytics analysis comprises:
    creating historic binary images from historic digital images by segmentation;
    extracting information from the historic digital images using spectral imaging, thereby generating historic multispectral images;
    obtaining new binary images from the digital images; and
    generating the joint probabilistic model based on differences between the historic multispectral images, historic binary images, and the new binary images.

19. The computer program product of claim 6, wherein the visual analytics analysis comprises:
    creating historic binary images from historic digital images by segmentation;
    extracting information from the historic digital images using spectral imaging, thereby generating historic multispectral images;
    obtaining new binary images from the digital images; and
    generating the joint probabilistic model based on differences between the historic multispectral images, historic binary images, and the new binary images.

20. The system of claim 11, wherein:
the objects comprise vegetation,
the analyzing the digital image data comprises:
    creating historic binary images from historic digital images by segmentation;
    extracting information from the historic digital images using spectral imaging, thereby generating historic multispectral images;
    obtaining new binary images from the digital images; and
    generating the joint probabilistic model based on differences between the historic multispectral images, historic binary images, and the new binary images.

\* \* \* \* \*